000# United States Patent Office 3,447,393
Patented June 3, 1969

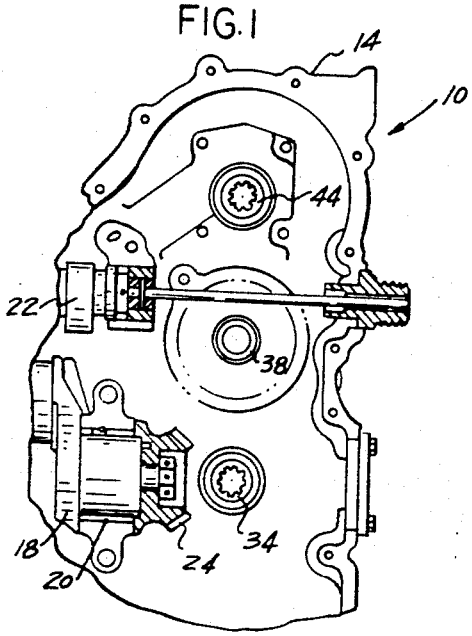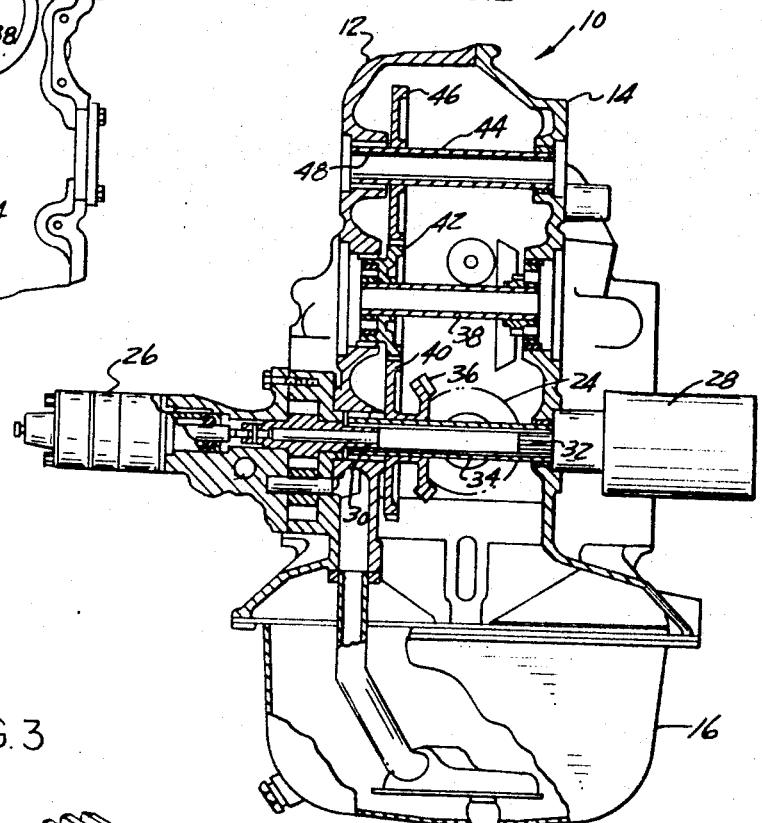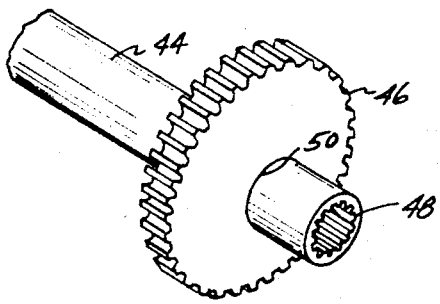

3,447,393
ENGINE ACCESSORY DRIVE SHAFT CONSTRUCTION
William A. Wiseman, Muskegon, and Paul G. Eberly, Muskegon Heights, Mich., assignors to Continental Motors Corporation, Detroit, Mich., a corporation of Virginia
Filed Aug. 29, 1967, Ser. No. 664,098
Int. Cl. F16h 1/20
U.S. Cl. 74—421        5 Claims

ABSTRACT OF THE DISCLOSURE

A fabricated accessory drive shaft for an aircraft engine formed from an internally splined shaft having a gear press fitted and induction welded on the shaft. The opposite ends of the shaft are drivingly engaged with a pair of opposedly mounted accessory units with the gear coupled to the output of the engine crankshaft.

BACKGROUND OF THE INVENTION

Field of the invention

This invention relates to internal combustion engines and more specifically to a fabricated accessory drive shaft construction for aircraft engines.

Description of the prior art

Engine accessories of aircraft engines such as the oil pump, the fuel pump, and the like are conventionally coupled to the engine crankshaft through a gear assembly and drive shaft. Normally the gear and the drive shaft are formed from a forging which requires expensive machining. In addition each shaft is only drivingly connected to a single accessory.

The broad purpose of the present invention is to reduce the cost of accessory drive shafts for internal combustion engines by providing a fabricated accessory shaft construction and to reduce the weight of high speed internal combustion engines by providing a shaft construction adapted to drive a pair of opposedly mounted accessory units.

SUMMARY

The preferred embodiment of the present invention which will be subsequently described in greater detail, is described with reference to a high speed, air cooled aircraft engine having the accessory units preferably integrally mounted to the rearward end of the crankcase and extending laterally therefrom to eliminate any external driving connections between the accessories and the crankcase. The accessories are mounted in pairs with each unit of each pair extending laterally sideways from the crankcase and each pair of units driven through a common drive shaft. The accessory drive shafts are mounted to the crankcase one above the other in parallel relationship with the lower drive shaft connected through a pair of bevel gears to the rear end of the crankshaft. The other accessory drive shafts each carry a drive gear meshed with a complementary gear carried by a neighboring shaft to form an accessory drive train. Two of the accessory drive shafts have a common length and diameter and are interchangeable during the manufacturing process. These interchangeable shafts are each formed from a centerless ground, internally splined shaft section. Each internally splined end engages an externally splined driving element carried by an accessory.

The preferred fabricated accessory shaft construction reduces the cost of manufacturing accessory drive shafts, and reduces the weight of high speed engines by providing a shaft that can drive a pair of accessory units.

It is therefore an object of the present invention to reduce the cost of manufacturing light weight, high speed aircraft engines by providing a fabricated accessory shaft construction.

It is another object of the present invention to provide a fabricated accessory drive shaft construction for aircraft engines comprising an internally splined shaft with a drive gear fitted and welded on the shaft.

Still another object of the present invention is to reduce the weight of high speed aircraft internal combustion engines by providing a fabricated accessory shaft construction which permits each accessory drive shaft to drive a pair of opposedly mounted engine accessory units.

Still further objects and advantages of the present invention will readily occur to one skilled in the art to which the invention pertains upon reference to the following detailed description.

DESCRIPTION OF THE DRAWINGS

The description refers to the accompanying drawing in which like reference characters refer to like parts throughout the several views and in which:

FIGURE 1 is a fragmentary longitudinal sectional view of an aircraft engine showing the rear end of the crankcase housing, an accessory drive section and the rear end of the crankshaft;

FIGURE 2 is a transverse sectional view through the aircraft engine of FIGURE 1 and showing upper and lower accessory drive shafts illustrating the preferred embodiment of the present invention; and FIGURE 3 is a fragmentary perspective view of the preferred accessory drive shaft.

DESCRIPTION OF THE PREFERRED EMBODIMENT

Now referring to the drawing, an internal combustion engine 10 is illustrated as comprising a pair of crankcase halves 12 and 14 joined together in a vertical plane and carrying a lower oil pan 16.

A rotatable crankshaft 18 is mounted on bearings carried by the crankcase halves 12 and 14 and rotates about a horizontal axis. A cam shaft 22 is supported for rotation above the crankshaft 18 and is also mounted between the crankcase halves 12 and 14. A bevel gear 24 is carried at the rear end of the crankshaft 18.

The accessory units associated with the engine 10 are mounted at the rearward end of the crankcase halves 12 and 14 and extend laterally from the crankcase.

The accessory units include an oil pump 26 and an oppositely mounted fuel pump 28 mounted on the crankcase half 14. The oil pump 26 has an externally splined driving element 30 and the fuel pump 28 has a similar externally splined driving element 32.

The driving elements 30 and 32 are supported on a common axis of rotation and driven by an accessory drive shaft 34. Accessory drive shaft 34 is supported for rotation about an axis transverse to the axis of rotation of the crankshaft 18 with its ends being supported by the crankcase halves 12 and 14. This arrangement allows the accessories 26 and 28 to be opposedly mounted directly to the crankcase halves thereby eliminating the necessity for external driving connections and permitting the two accessories to be driven from a common drive shaft.

A bevel gear 36 carried intermediate the ends of the drive shaft 34 is meshed with the bevel gear 24 carried by the crankshaft so that the gears 24 and 36 provide gear means for drivably coupling the accessory drive shaft 34 to the crankshaft 18.

An intermediate drive shaft 38 is mounted above and in parallel relationship to the shaft 34 by the crankcase halves 12 and 14. The drive shaft 38 is adapted for driving a pair of engine magnetos (not shown) and is drivably coupled to the shaft 34 by a gear 40 carried by the shaft 34 which is in mesh with a complementary gear 42 carried by the intermediate shaft 38.

An upper accessory drive shaft 44 is mounted above the shafts 34 and 38 and suported with its opposite ends journaled in the crankcase halves 12 and 14. Drive shaft 44 is adapted to drive another pair of oppositely mounted accessories (not shown) which can be directly mounted on the crankcase halves 12 and 14 and driven from a common driving element. The upper shaft 44 has a configuration similar to the lower shaft 34 so that the two shafts are interchangeable during the manufacturing process, the primary difference being that the lower shaft carries the bevel gear 36.

A gear is carried by the shaft 44 and is in mesh with the gear 42 carried by the intermediate shaft 38. Thus it can be seen that the upper shaft 44 is drivably coupled through gear means 36, 40, 42 and 46 to the crankshaft 18.

The shafts 34 and 44 are of fabricated construction. As best seen in FIGURE 3, the shaft 44 is hollow with an axial bore defined by a plurality of longitudinally extending internal splines 48 which provide means for coupling the shaft to accessories having an externally splined driving element. The shaft 44 is preferably formed from a centerless ground shaft section. The gear 46 is preferably formed from a piece of flat stock with an axial bore 50 having an interference diameter relative to the diameter of the shaft 44. The gear 46 is press fitted on the shaft 44 and then induction welded in place to provide an inexpensive, but reliable, fabricated accessory shaft construction.

Although we have described but one embodiment of our invention, it is to be understood that various changes and revisions can be made therein without departing from the spirit of the invention as expressed in the scope of the appended claims.

Having described our invention we claim:

1. In an internal combustion engine having a crankcase, a rotatably driven crankshaft mounted on said crankcase and an accessory having an externally splined driving element, means for connecting said accessory to said crankshaft comprising:

(a) an accessory driveshaft supported on said crankcase for rotation about the axis of rotation of said splined driving element and having an axial bore defined by an annular series of longitudinally extending internal splines with one end of said drive shaft meshed in driving engagement with said splined driving element; and (b) gear means coupling said crankshaft to said accessory drive shaft and including a gear member fixedly mounted on said accessory drive shaft.

2. The invention as defined in claim 1, wherein said gear is mounted on said shaft by providing said gear with an axial bore having an interference diameter relative to the outer diameter of said accessory drive shaft, pressing said gear on said accessory drive shaft, and welding said gear to said accessory drive shaft.

3. The invention as defined in claim 1, wherein said accessory drive shaft is supported adjacent its ends by said crankcase and said gear is mounted intermediate said ends.

4. The invention as defined in claim 3, wherein each end of said drive shaft is adapted to engage an externally splined driving element so that said accessory drive shaft can drive a pair of opposed accessories mounted on said crankcase.

5. The invention as defined in claim 1, including a second internally splined accessory drive shaft mounted on said crankcase in spaced parallel relationship to said first mentioned accessory drive shaft, and including a second pair of gear means interconnecting said second accessory drive shaft to said first mentioned drive shaft.

References Cited

UNITED STATES PATENTS

| | | |
|---|---|---|
| 2,678,037 | 5/1954 | Wiegman et al. |
| 2,939,440 | 6/1960 | Leonard et al. |

FOREIGN PATENTS

| | | |
|---|---|---|
| 230,560 | 2/1960 | Australia. |

DONLEY J. STOCKING, *Primary Examiner.*

L. H. GERIN, *Assistant Examiner.*

U.S. Cl. X.R.

74—15.2, 15.63, 434; 123—195; 287—53